(12) United States Patent
Feldmann et al.

(10) Patent No.: US 10,494,943 B2
(45) Date of Patent: Dec. 3, 2019

(54) SPLINE SEAL FOR A GAS TURBINE ENGINE

(71) Applicant: General Electric Company, Schenectady, NY (US)

(72) Inventors: Kevin Robert Feldmann, Mason, OH (US); Aaron Ezekiel Smith, Montgomery, OH (US)

(73) Assignee: General Electric Company, Schenectady, NY (US)

(*) Notice: Subject to any disclaimer, the term of this patent is extended or adjusted under 35 U.S.C. 154(b) by 567 days.

(21) Appl. No.: 15/014,057

(22) Filed: Feb. 3, 2016

(65) Prior Publication Data

US 2017/0218784 A1    Aug. 3, 2017

(51) Int. Cl.
| | | |
|---|---|---|
| F01D 11/00 | (2006.01) | |
| F01D 9/04 | (2006.01) | |
| F16J 15/48 | (2006.01) | |
| F16J 15/02 | (2006.01) | |
| F16J 15/46 | (2006.01) | |

(52) U.S. Cl.
CPC ............ *F01D 11/005* (2013.01); *F01D 9/041* (2013.01); *F16J 15/02* (2013.01); *F16J 15/46* (2013.01); *F16J 15/48* (2013.01); *F05D 2220/32* (2013.01); *F05D 2240/57* (2013.01); *F05D 2250/74* (2013.01); *F05D 2250/75* (2013.01); *Y02T 50/673* (2013.01)

(58) Field of Classification Search
CPC . F01D 11/005; F01D 9/04; F01D 9/041; F16J 15/02; F16J 15/46; F16J 15/48; F05D 2250/75
See application file for complete search history.

(56) References Cited

U.S. PATENT DOCUMENTS

| | | | |
|---|---|---|---|
| 3,801,220 A * | 4/1974 | Beckershoff | ............ F01D 5/06 415/134 |
| 5,154,577 A | 10/1992 | Kellock et al. | |
| 5,655,876 A | 8/1997 | Rock et al. | |
| 5,957,658 A | 9/1999 | Kasprow et al. | |
| 6,162,014 A | 12/2000 | Bagepalli et al. | |
| 6,503,051 B2 | 1/2003 | Predmore | |
| 7,090,224 B2 | 8/2006 | Iguchi et al. | |
| 7,575,415 B2 | 8/2009 | Drerup et al. | |
| 7,625,174 B2 | 12/2009 | Drerup et al. | |

FOREIGN PATENT DOCUMENTS

| | | | |
|---|---|---|---|
| EP | 1 275 819 A2 | 1/2003 | |
| EP | 2 039 886 A1 | 3/2009 | |
| EP | 2 799 667 A1 | 11/2014 | |
| EP | 2799667 A1 * | 11/2014 | ............ F01D 11/006 |

OTHER PUBLICATIONS

Extended European Search Report and Written Opinion issued in connection with corresponding EP Application No. 17153876.2 dated Dec. 15, 2017.

* cited by examiner

*Primary Examiner* — Brian P Wolcott
(74) *Attorney, Agent, or Firm* — McGarry Bair PC

(57) ABSTRACT

Embodiments of the invention relate to a turbine assembly including a shroud assembly and a nozzle assembly axially adjacent to each other which both include confronting radial sides and confronting axial ends. A spline connector having a circumferential portion and an axial portion such that the circumferential portion of the spline connector extends across the axial ends and the axial portion of the spline connector extends across the confronting radial sides.

20 Claims, 5 Drawing Sheets

US 10,494,943 B2

SPLINE SEAL FOR A GAS TURBINE ENGINE

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. In the compressor stages, the blades are supported by posts protruding from the rotor while the vanes are mounted to stator disks. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components is necessary during operation. Reducing cooling air leakage between adjacent flow path segments in gas turbine engines is desirable to maximize efficiency and lower specific fuel consumption. In adjacent compressor and turbine stages, axial and radial segment gaps create flow paths allowing leakage. Spline seals are used to decrease the leakage in these areas.

BRIEF DESCRIPTION OF THE INVENTION

In one aspect, embodiments of the invention relate to a turbine assembly for a gas turbine engine defining an axial centerline, the turbine assembly comprising a shroud assembly having a plurality of circumferentially arranged shroud segments, which have confronting radial sides and collectively define at least one circumferential axial end. Included is a nozzle assembly having a plurality of circumferentially arranged nozzle segments, which have confronting radial sides and collectively define at least one circumferential axial end. There is also a spline connector having a circumferential portion and an axial portion, wherein the shroud assembly and nozzle assembly are axially adjacent such that the axial ends are confronting and the circumferential portion of the spline connector extends across the axial ends and the axial portion of the spline connector extends across the confronting radial sides of at least one of the shroud segments or the nozzle segments.

In another aspect, embodiments of the invention relate to a turbine assembly for a gas turbine engine defining an axial centerline, the turbine assembly comprising a shroud segment having opposing radial sides and opposing axial ends, a nozzle segment having opposing radial sides and opposing axial ends, and a spline connector having a circumferential portion and an axial portion. The shroud segment and nozzle segment are axially adjacent to form a pair of confronting axial ends and the circumferential portion of the spline connector extends across the axial ends and the axial portion of the spline connector extends along one of the radial sides of at least one of the shroud segment or the nozzle segment.

DESCRIPTION OF EMBODIMENTS OF THE INVENTION

The described embodiments of the present invention are directed to systems, methods, and other devices related to routing air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
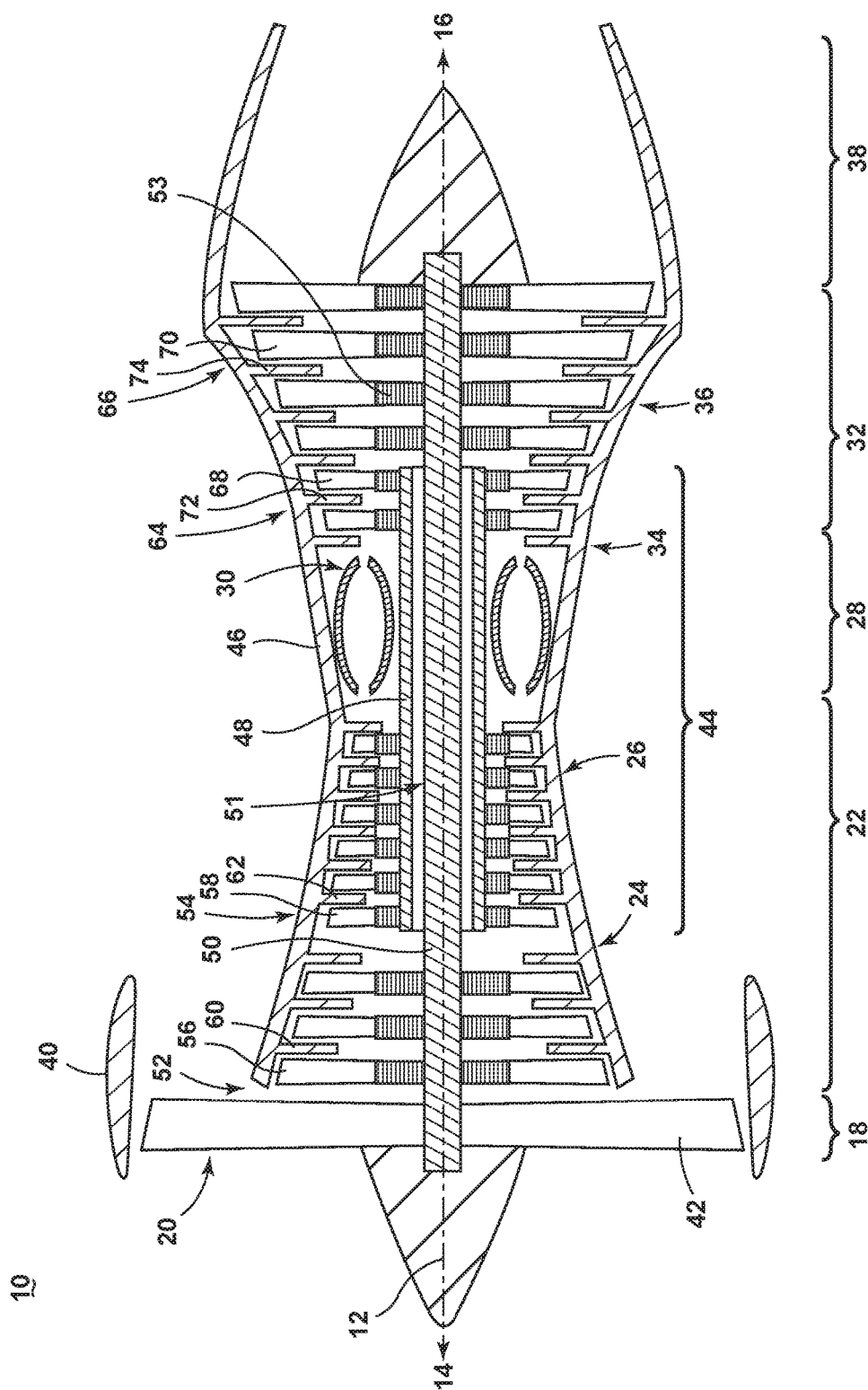
FIG. 1 is a schematic, sectional view of a gas turbine engine according to an embodiment of the invention.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine assemblies 100 comprising stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compress 24 or the HP compressor 26.

Figure 2:
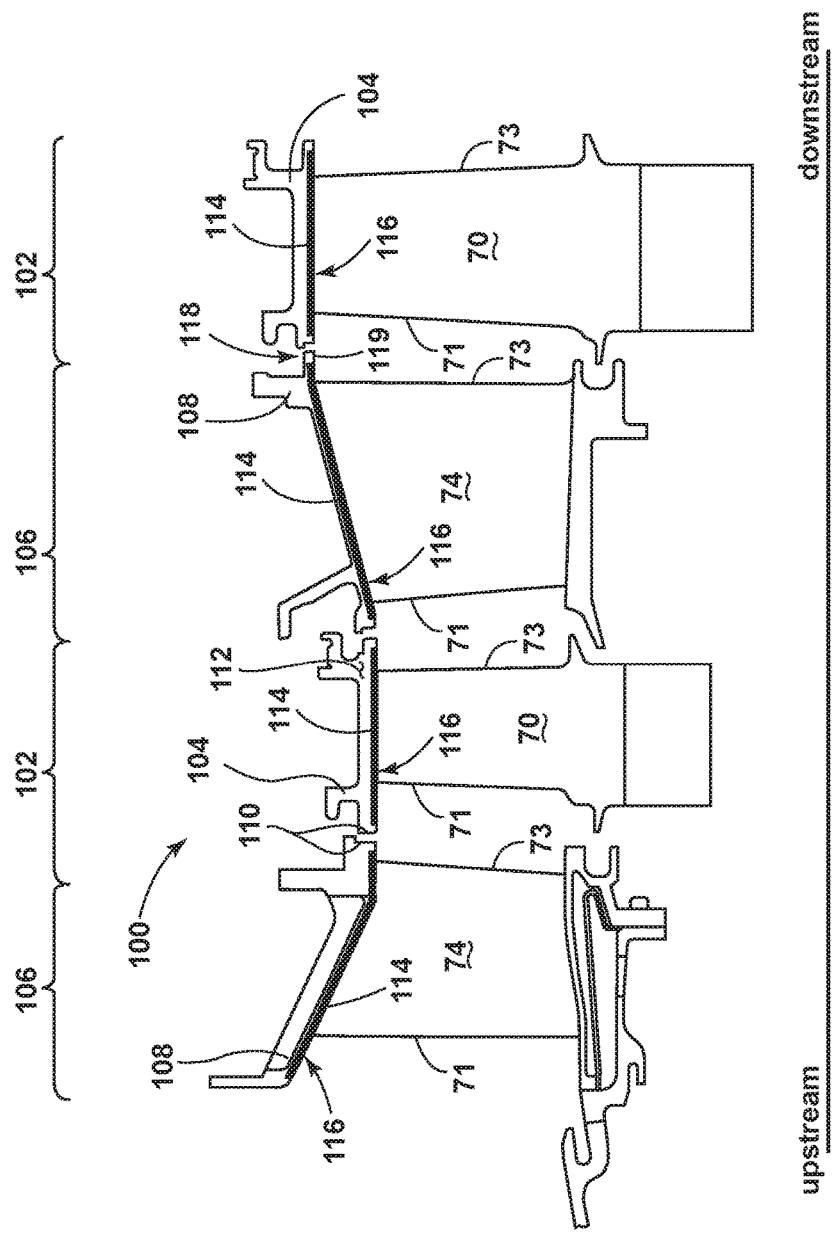
FIG. 2 is a schematic, sectional view of a turbine assembly.

FIG. 2, illustrates one possible turbine assembly 100 suitable for use in the gas turbine engine 10 of FIG. 1. The turbine assembly 100 comprises at least one shroud assembly 102 having a plurality of circumferentially arranged shroud segments 104 around the blades 70 and at least one nozzle assembly 106 having a plurality of circumferentially arranged nozzle segments 108 to which the vanes 74 are fixed. Each of the blades 70 and vanes 74 have a leading edge 71 and a trailing edge 73. The shroud segments 104 and nozzle segments 108 collectively define at least one circumferential axial end 110. The nozzle assembly 106 is located upstream of the shroud assembly 102 to define a pair of opposing and confronting upstream axial ends 110. Another nozzle assembly 106 can be located downstream of the shroud assembly 102 defining a pair of confronting downstream axial ends 110. Each of the shroud and nozzle assemblies 102, 106 have opposing and confronting radial sides 112.

A spline connector 116 includes an axial portion 114 which extends along the top portion covering the confronting radial sides 112 of the shroud segment 104. In an exemplary embodiment, the axial portion 114 of the spline connector 116 also extends along the top portion of confronting radial sides 112 of the nozzle segment 108. When placed the spline connector 116 can leave an axial space 118 proximate the downstream edge 119 of the nozzle segment 108 to reduce chute leakage aft.

Figure 3:
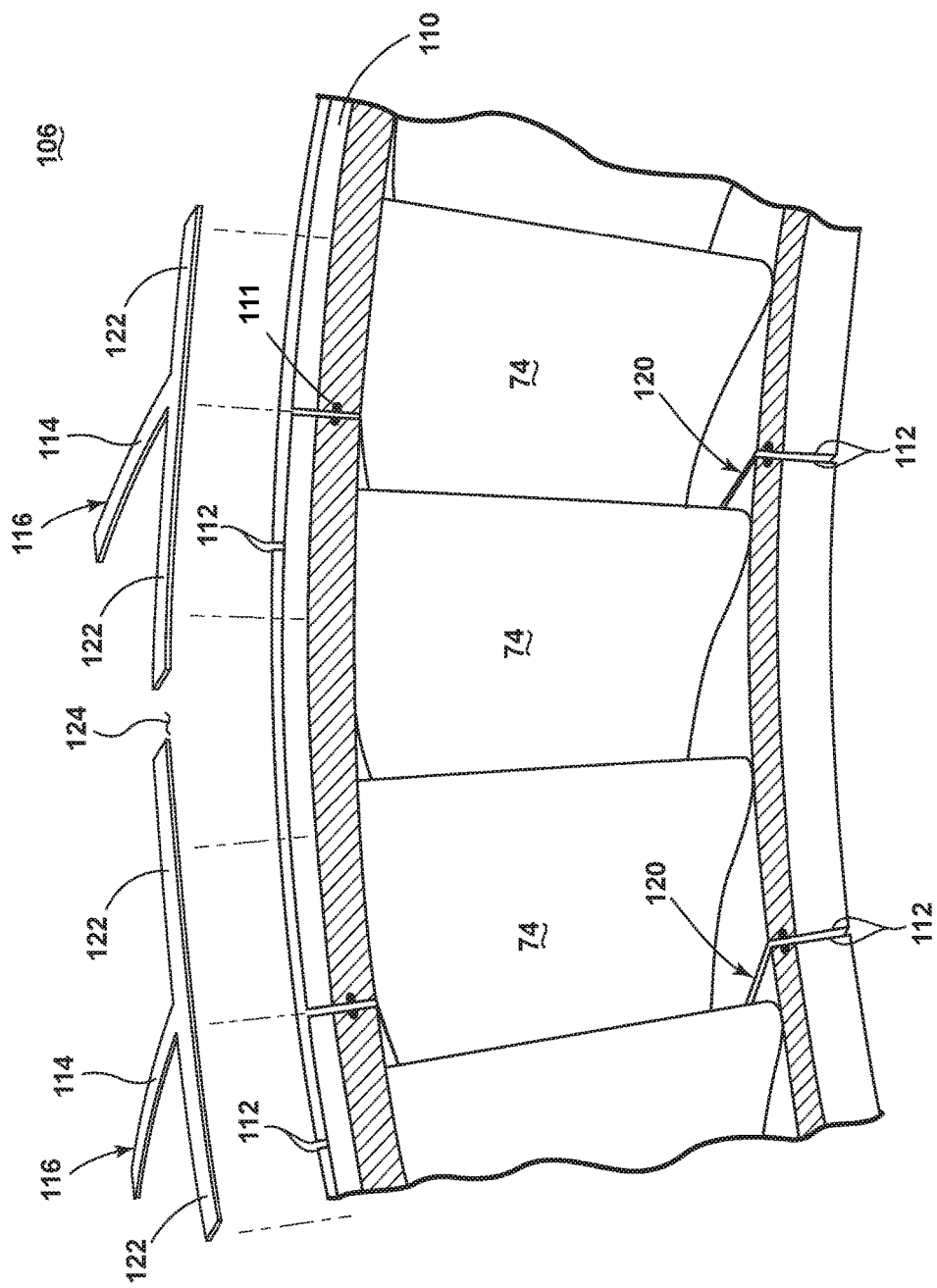
FIG. 3 is a perspective view of a nozzle assembly.

In an exemplary embodiment the spline connector 116 has a T-shape as seen in FIG. 3. The nozzle assembly 106 as seen from the circumferential axial end 110 highlights the confronting radial sides 112 as defining corresponding gaps 120 across which the axial portion 114 of the spline connector 116 extends like a strip of tape covering two surfaces. The spline connector 116 is placed so that the axial portion 114 spans the gap 120 to seal a portion of the gap 120 and two circumferential portions 122 connected by the axial portion 114 span the upstream and downstream axial ends 110. A circumferential space 124 between sequential spline connectors 116 is aligned with the location of a high pressure combustion gas flow in order to purge the flow. This is known as a "bow-wave" and is near the leading edge 71 of the vanes 74. In an alternative embodiment, the spline connector can also rest within a slot 111 while still spanning the gap 120.

Figure 4:
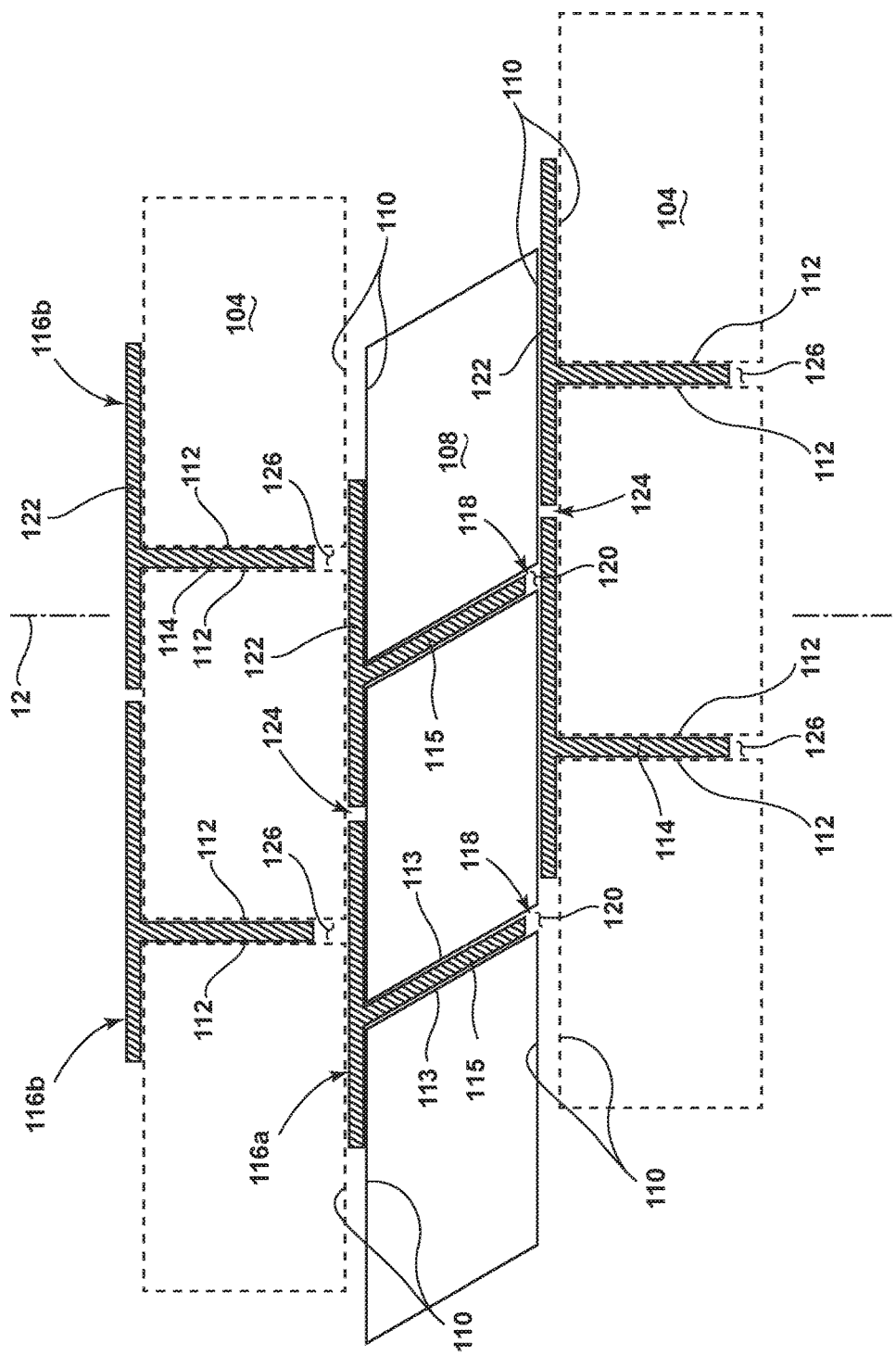
FIG. 4 is a schematic top view of a first embodiment of the invention.

The shroud assembly 102 and nozzle assembly 106 are axially adjacent as seen in FIG. 4, which schematically illustrates the two circumferential groups of shroud segments with an intervening group of nozzle segments 108, all of which are laid flat for clarity. The confronting radial sides 112 of the shroud assembly 102 also define corresponding gaps 126 where the axial portion 114 of the spline connector 116 seals at least a portion of the gap 126 when the axial portion 114 spans the gap 126. The gaps 120, 126 for the shroud segments 104 and nozzle segments 108 are circumferentially non-aligned.

At least one of the gaps 120 can be oriented at an angle relative to the axial centerline 12 forming an angled confronting radial side 113. Two examples of spline connectors 116 are depicted in the illustrated embodiment of FIG. 4 both still maintaining a T-shape. A first spline connector 116a extends across the upstream axial ends 110 and the angled confronting radial sides 113 of the nozzle segments 108 with a leg 115 being at an angle corresponding to the angle of the radial sides 113. A second spline connector 116b extends across the downstream axial ends 110 and the confronting radial sides 112 of the downstream shroud segments 104.

Figure 5:
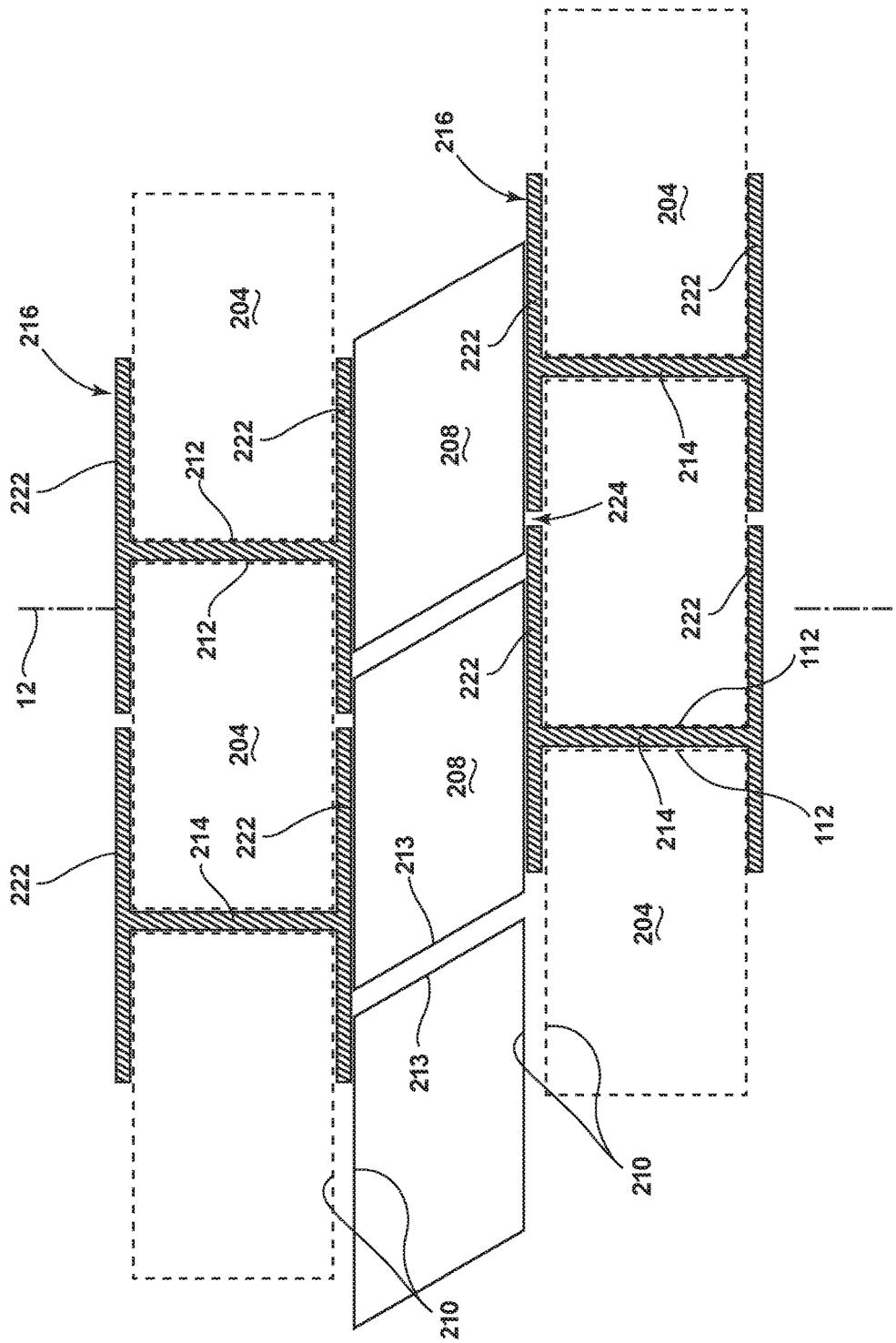
FIG. 5 is a schematic top view of a second embodiment of the invention.

In a second embodiment illustrated in FIG. 5, which is again laid flat for clarity from the actual circumferential orientation, a spline connector 216 has an I or H shape. The spline connector 216 comprises two circumferential portions 222 connected by an axial portion 214, extending across radial sides 212 of shroud segments 204, with circumferential portions 222 extending across upstream and downstream axial ends 210 leaving a circumferential space 224. The I or H shaped spline connector 216 does not extend across angled radial sides 213 of the nozzle segment 208.

A further embodiment can include an I shape with angled axial portions extending across the angled radial sides 213 of FIG. 4 and circumferential portions extending across the corresponding axial ends 210. Still another embodiment can include an L shape with an axial and circumferential portion extending across corresponding radial and axial ends.

The spline connector addresses concerns for local ingestion or possible over-temperature failure modes with the circumferential space near the bow-wave while including another seal in series in regions typically not sealed between axial components. Sealing these additional regions lowers specific fuel consumption and therefore increases efficiency.

In the case of an axial curvature or slope in the arrangement of the shroud and nozzle assemblies, embodiments of the spline connector can include an axial break to facilitate curvature or the spline connector can be pre-bent to match a flow path curvature or step stack up. The axial portion of the spline connector can be locked in place when assembled and local thinning or keyholes on the spline connectors can be formed to provide flexibility if needed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine assembly for a gas turbine engine defining an axial centerline, the turbine assembly comprising:
    a shroud assembly having a plurality of circumferentially arranged shroud segments, which have confronting radial sides and collectively define at least one circumferential axial end;
    a nozzle assembly having a plurality of circumferentially arranged nozzle segments, which have confronting radial sides and collectively define at least one circumferential axial end; and
    a spline connector having a circumferential portion and an axial portion;
    wherein the shroud assembly and nozzle assembly are axially adjacent such that the at least one circumferential axial end of the shroud assembly is confronting the at least one circumferential axial end of the nozzle assembly to define confronting axial ends and the circumferential portion of the spline connector extends between the confronting axial ends and the axial portion of the spline connector extends across confronting radial sides of: the plurality of circumferentially arranged shroud segments, the plurality of circumferentially arranged nozzle segments, or both the plurality of circumferentially arranged shroud segments and the plurality of circumferentially arranged nozzle segments;
    wherein the confronting radial sides of the plurality of circumferentially arranged shroud segments and the plurality of circumferentially arranged nozzle segments define corresponding gaps and the corresponding gaps for the plurality of circumferentially arranged shroud segments and the plurality of circumferentially arranged nozzle segments are circumferentially non-aligned.

2. The turbine assembly of claim 1 wherein the axial portion of the spline connector seals at least a portion of the corresponding gaps when the axial portion spans the corresponding gaps.

3. The turbine assembly of claim 1 wherein the spline connector has a T-shape with the circumferential portion spanning at least one of the corresponding gaps associated with the plurality of circumferentially arranged nozzle segments.

4. The turbine assembly of claim 1 wherein at least one of the corresponding gaps are oriented at an angle relative to the axial centerline.

5. The turbine assembly of claim 4 wherein the spline connector has a T-shape with the circumferential portion spanning at least one of the corresponding gaps associated with the plurality of circumferentially arranged nozzle segments.

6. The turbine assembly of claim 1 further comprising another nozzle assembly, with one nozzle assembly located upstream of the shroud assembly to define a pair of confronting upstream axial ends, the other nozzle assembly located downstream of the shroud assembly to define a pair of confronting downstream axial ends, and the spline connector comprises two circumferential portions connected by the axial portion, with the two circumferential portions extending across the upstream and downstream axial ends and the axial portion extending across the radial sides of the plurality of circumferentially arranged shroud segments.

7. The turbine assembly of claim 6 wherein the spline connector has an I-shape.

8. The turbine assembly of claim 1 further comprising another shroud assembly, with one shroud assembly located upstream of the nozzle assembly to define a pair of confronting upstream axial ends, the other shroud assembly located downstream of the nozzle assembly to define a pair of confronting downstream axial ends.

9. The turbine assembly of claim 8 wherein the spline connector comprises two circumferential portions connected by the axial portion, with the two circumferential portions extending across the confronting upstream and downstream axial ends and the axial portion extending across the radial sides of the plurality of circumferentially arranged shroud segments.

10. The turbine assembly of claim 8 wherein the confronting radial sides of the plurality of circumferentially arranged nozzle segments form an angle relative to the axial centerline to define angled confronting radial sides, and a first spline connector extends across the confronting upstream axial ends and the angled confronting radial sides of the plurality of circumferentially arranged nozzle segments, and a second spline connector extends across the confronting downstream axial ends and the confronting radial sides of downstream shroud segments.

11. The turbine assembly of claim 10 wherein the first and second spline connectors both have a T-shape, with a leg of the first spline connector being at an angle corresponding to the angle of the radial sides of the plurality of circumferentially arranged nozzle segments.

12. The turbine assembly of claim 1 wherein the spline connector comprises a single body where the axial portion terminates in and is connected to the circumferential portion.

13. A turbine assembly for a gas turbine engine defining an axial centerline, the turbine assembly comprising:
    a shroud segment having opposing radial sides and opposing axial ends;
    a nozzle segment having opposing radial sides and opposing axial ends; and
    a spline connector having a circumferential portion and an axial portion;
    wherein the shroud segment and nozzle segment are axially adjacent to form a pair of confronting axial ends and the circumferential portion of the spline connector extends across the confronting axial ends and the axial portion of the spline connector extends along one of the opposing radial sides of at least one of the shroud segment and the nozzle segment;
    wherein the opposing radial sides of the shroud segment are circumferentially non-aligned with the opposing radial sides of the nozzle segment.

14. The turbine assembly of claim 13 wherein at least one of the opposing radial sides is oriented at an angle relative to the axial centerline and the axial portion of the spline connector is also oriented at the angle.

15. The turbine assembly of claim 14 wherein the spline connector has a T-shape.

16. The turbine assembly of claim 13 wherein the spline connector comprises a second circumferential portion, axially spaced from the other circumferential portion, and extending along the other of the opposing axial ends of the shroud segment.

17. The turbine assembly of claim 15 wherein the spline connector has an I-shape.

18. The turbine assembly of claim 13 wherein the spline connector has a T-shape.

19. The turbine assembly of claim 13 wherein at least one of the opposing radial sides of the shroud segment or opposing radial sides of the nozzle segment are angled relative to the axial centerline.

20. The turbine assembly of claim 13 wherein the spline connector comprises a single body where the axial portion terminates in and is connected to the circumferential portion.

\* \* \* \* \*